United States Patent Office 3,418,313
Patented Dec. 24, 1968

3,418,313
PROCESS FOR PRODUCING TRIMETHYL-
SILYLATED CELLULOSE
Johann F. Klebe, Schenectady, N.Y., assignor to General
Electric Company, a corporation of New York
No Drawing. Filed Sept. 9, 1966, Ser. No. 578,161
2 Claims. (Cl. 260—212)

ABSTRACT OF THE DISCLOSURE

Trimethylsilylated cellulose containing 2 to 3 trimethylsilyl units per anhydroglucose unit that are soluble in common organic solvents are produced by the reaction of cellulose with pure trimethylchlorosilane, produced by the decomposition of hexamethyldisilazane with anhydrous hydrogen chloride, in the presence of a tertiary amine. These trimethylsilylated celluloses are useful as paper release agents and the like.

---

This invention relates to a method of producing trimethylsilylated cellulose. More particularly, this invention relates to a method of producing trimethylsilylated cellulose which is soluble in organic solvents.

Heretofore, it has been known to prepare silicon derivatives of cellulose by treating cellulose with an alkylchlorosilane in the presence of a hydrogen halide acceptor such as a tertiary amine as is set forth in U.S. Patent 2,562,955, issued Aug. 7, 1951. This patent teaches a method that produces trimethylsilylated celluloses which are insoluble in the common organic solvents employed to dissolve the usual cellulosic esters and ethers, i.e., benzene, toluene, chloroform, ethylenechloride, carbon tetrachloride, etc.

It is believed that the insolubility of these trimethylsilylated celluloses is caused by impurities in the trimethylchlorosilane. The commercial trimethylchlorosilane available is prepared either by the reaction of silicon and methylchloride or by the reaction of silicon tetrachloride and methyl Grignard reagent which methods produce mixtures of the methylchlorosilanes. The boiling points of these methylchlorosilanes are very close to one another and thus during the distillations minor amounts, i.e., less than 1%, by weight, of impurities remain in the various fractions. Although not wishing to be bound by this theory, it is believed that the impurity in trimethylchlorosilane is methyltrichlorosilane, a very minor amount, i.e., less than 1%, by weight, of which will cause crosslinking and insolubilization of the cellulosic derivatives.

I have now discovered a method whereby I can prepare trimethylsilylated celluloses which contain from 2 to 3 trimethylsilyl units per anhydroglucose unit in the celluloses, which are soluble in aliphatic, aromatic, chlorinated aliphatic and chlorinated aromatic liquid hydrocarbons. By rendering these highly trimethylsilylated celluloses soluble in these solvents, the utility of the trimethylsilyalted celluoses is greaty increased since they now can be employed as solutions to coat various substrates rendering the substrates hydroprophobic and also, to impart better release properties to the substrates. For example, when trimethylsilylated cellulose is coated on the spout portion of a milk carton prior to sealing, the seal is rendered less apt to stick and thus the milk cartons can be opened more readily. This is due to the fact that the trimethylsilylated cellulose will not allow the coated paper to adhere to itself.

In accordance with my invention, I have discovered that trimethylsilylated celluloses can be produced which are soluble in liquid aliphatic and aromatic hydrocarbons and liquid chlorinated aliphatic and aromatic hydrocarbons, in accordance with the following procedure. An admixture of an aromatic solvent or mixture of such solvents, cellulose and a tertiary amine is formed and the admixture heated to the reflux temperature of the solvent, i.e., from 50° to 150° C. to the admixture is then added pure trimethylchlorosilane, e.g., that prepared by the decomposition of hexamethyldisilazane with anhydrous hydrogen chloride, and the mixture maintained at reflux, i.e., from 50° C. to 250° C., whereby said pure trimethylchlorosilane and the cellulose react to produce a trimethylsilylated cellulose.

The trimethylsilylated cellulose is recovered from the reaction medium by adding the reaction medium to an alcohol such as methanol containing a small amount of sodium acetate, whereby the trimethylsilylated cellulose is precipitated from the solution.

The cellulose employed in this invention can be that derived from cotton or from wood pulps, preferably chemical wood pulps, such as sulfate, sulfite or soda pulps from which the pentosan, lignin, resin and like constituents have been removed.

In accordance with the process of this invention, one employs at least 2 moles of trimethylchlorosilane for each mole of cellulose employed. Expressed another way, one employs 0.67 equivalent of trimethylchlorosilane for each equivalent hydroxyl group in the cellulose. Where essentially complete silylation is desired, one can employ from about 1.1 to 2 equivalents of trimethylchlorosilane for each equivalent hydroxyl group in the cellulose, that is, in the anhydroglucose units of the cellulose.

In conducting the process of this invention, one should employ at least one mole of the tertiary amine for each mole of the trimethylchlorosilane present. This amount of the tertiary amine is necessary to insure that the liberated hydrogen chloride is immediately neutralized and thereby eliminating undesirable side reactions.

The temperature at which the process of this invention is conducted can vary over a wide range and will depend to some extent upon the boiling point of the particular solvent employed. The temperature at which the reaction is conducted is preferably maintained between 50° C. and 250° C.

The aromatic solvents which can be employed in the process of this invention are the solvents such as benzene, toluene, xylene, etc. The amount of solvent used can vary, by weight, from about 10 to 1000 parts of the solvent per 100 parts of the total weight of the cellulose and trimethylchlorosilane. It is preferred for simplicity of operation and ease of recovery of the reaction products to employ, on a weight basis, at least 100 parts of the solvent per 100 parts of the total weight of the cellulose and trimethylchlorosilane.

The pure trimethylchlorosilane required to produce the soluble trimethylsilylated cellulose can be prepared by the decomposition of hexamethyldisilazane by hydrogen chloride and subsequent distillation. I have found that normally trimethylchlorosilane contains certain impurities which lead to insolubilization of the trimethylsilylated cellulose when employed to silylate cellulose.

The tertiary amines which can be used as the hydrogen halide acceptor in the process of this invention include aliphatic tertiary amines, tertiary polyamines and cyclic tertiary amines and heterocyclic tertiary amines. These tertiary amines include, for example, trimethylamine, triethylamine, tripropyl amines, methyldipropyl amines, dimethyl phenylethyl amine, pyridine, morpholine, N-alkylpyrrolidones, N-alkylpyrroles, $\gamma$-collidine, $\alpha$-, $\beta$- and $\gamma$-picoline, the N-alkylpiperidines, etc.

The following example serves to further illustrate this invention. All parts are by weight unless otherwise stated. The triethylchlorosilane employed in the example was prepared as follows. Anhydrous HCl gas was bubbled into a solution of 100 g. hexamethyldisilazane in 200 cc. diethyl ether until the slightly exothermic reaction subsided. Ammonium chloride was filtered off and the filtrate fractionated to yield pure trimethylchlorosilane (B.P. 55–57° C.)

Example 1

A mixture of 50 grams of xylene, 10 grams of pyridine and 1.6 grams of cellulose was placed in a flask and heated with stirring to 100 to 110° C. To this mixture was then added pure trimethylchlorosilane (5.0 grams, 0.045 mole). The resulting mixture was heated at 100 to 110° C. for 4 hours, during which time the cellulose dissolved in the xylene and formed a solution. The mixture was filtered to remove the pyridine hydrochloride and the filtrate slowly added with stirring to methanol containing 1 gram of sodium acetate. The trimethylsilylated cellulose was obtained as a colorless fiber. The fiber was washed with methanol and dried at 40° C. in vacuo. There was obtained 3.1 grams of trimethylsilyl cellulose which is 82% of the theory based on the weight increase for complete silylation. This calculates to be cellulose containing 2.46 trimethylsilyl units per anhydroglucose unit. The trimethylsilyl cellulose was completely soluble in benzene, toluene, xylene, chloroform, carbon tetrachloride, methylene chloride, etc.

It will, of course, be apparent to those skilled in the art that in addition to the solvent given in the example, other solvents, many examples of which have been given above may be employed without departing from the scope of the invention. The conditions whereby the silylation is carried out may also be varied as is indicated previously by the disclosure and example.

What is claimed as new and is desired to secure by Letters Patent of the United States is:

1. A process for producing trimethylsilylated cellulose containing from 2 to 3 trimethylsilyl units per anhydroglucose unit of said cellulose, said cellulose being soluble in a solvent selected from the class consisting of aliphatic hydrocarbons, aromatic hydrocarbons and chlorinated aliphatic and aromatic hydrocarbons, which comprises forming an admixture of cellulose, a tertiary amine and a solvent and heating said admixture to a temperature of from about 50° C. to 150° C. and thereafter adding to said admixture pure trimethylchlorosilane produced by the decomposition of hexamethyldisilazane with anhydrous hydrogen chloride, and heating the resulting mixture to a temperature of from 50° C. to 250° C., whereby said trimethylchlorosilane reacts to produce a solution of trimethylsilylated cellulose.

2. A process as claimed in claim 1 where said solvent is xylene and said tertiary amine is pyridine.

References Cited

UNITED STATES PATENTS 2,562,955   8/1951   Schuyten et al. _____ 290—212

DONALD E. CZAJA, Primary Examiner.

R. W. MULCAHY, Assistant Examiner.

U.S. Cl. X.R.

260—448.2